Oct. 23, 1956

F. H. MUELLER ET AL 2,767,729

TAPERED ROTARY PLUG VALVE

Filed Nov. 9, 1953

INVENTOR
Frank H. Mueller
Walter J. Bowan

BY Cushman, Darby & Cushman
ATTORNEYS

Oct. 23, 1956　　F. H. MUELLER ET AL　　2,767,729
TAPERED ROTARY PLUG VALVE
Filed Nov. 9, 1953.　　2 Sheets-Sheet 2

INVENTOR
*Frank H. Mueller*
*Walter J. Bowan*
BY *Cushman, Darby & Cushman*
ATTORNEYS

United States Patent Office 2,767,729
Patented Oct. 23, 1956

2,767,729

TAPERED ROTARY PLUG VALVE

Frank H. Mueller and Walter J. Bowan, Decatur, Ill., assignors to Mueller Co., Decatur, Ill., a corporation of Illinois Application November 9, 1953, Serial No. 390,882

7 Claims. (Cl. 137—246.19)

This invention relates to rotary plug valves, and more particularly to means for retaining the plug of a tapered rotary plug valve in engagement with its seat.

A tapered plug should be held in metal-to-metal contact with its seat with a substantially constant optimum force in order to obtain the most effective seal between the contacting surfaces of the plug and its seat. Such optimum force is directly related to the area of sealing contact between a tapered plug and its seat. If the seating force is excessive, the plug will bind or wedge so tightly that turning thereof becomes extremely difficult, if not impossible. Further, an excessive seating force causes early failure of any film of lubricant between the sealing surfaces of a plug and its seat. Additionally, an excessive seating force may result in an actual distortion or deformation of either the plug or the seat to such an extent that leakage will take place through the valve. If the seating force is not high enough, obviously leakage will occur between the sealing surfaces of the plug and its seat.

In ecrtain types of tapered rotary plug valves, the means which holds the plug in engagement with its seat is yieldable, so that the plug may be unseated slightly if it becomes necessary to free it from an engagement with its seat that is so tight, e. g., after a long period of disuse, that the plug can be turned only with great difficulty or not at all unless so unseated. The provision of such yieldable plug-seating means gives rise to practical operating difficulties, however, particularly in rotary plug valves that are designed for use at high operating pressures.

When the plug or key of a tapered rotary plug valve, which also is known as a "ground key stop," is slightly unseated or a leak develops and propagates over the sealing surfaces between the plug and its seat, line pressure acts on the tapered surface of the plug and creates an unseating force. This force is equal to the effective pressure multiplied by an area substantially equal to the difference between the cross-sectional areas of the plug at the largest and smallest diameters thereof in sealing engagement with the seat. Of course, such an unseating force must be overcome in order to prevent a continuing and increasing leak. Heretofore this force has been overcome by two types of the aforementioned yielding plug-seating means, neither of which is satisfactory from an operating standpoint. One type consists of a spring engaged with the plug and with the body of the valve to urge the plug into engagement with its seat. The other type consists in the utilization of line pressure to seat the plug by exposing the end face at the large end of the latter to such pressure by means of a by-pass arrangement.

Plug-seating means which utilizes line pressure usually provides a much greater seating force than is actually necessary, particularly in valves and stops larger than one-inch nominal size designed for high pressure use. The area of the large end of the plug increases as the square of its diameter. Hence, since plug tapers are substantially constant irrespective of plug size, the plug end area increases more rapidly with increasing valve sizes than the difference between the cross-sectional areas of the plug at the largest and smallest diameters thereof in sealing engagement with the seat. Thus, the seating force effected by full line pressure acting on the full area of the large end of the plug becomes excessive in the larger valves.

In valves wherein the plug is spring-seated, the spring load must be sufficient to maintain the plug seated at the maximum design pressure of the valve. i. e., overcome the aforedescribed unseating force developed by such design pressure. Valves are frequently used, however, to control pressures that are of the order of one-third to one-half rated design pressure, or even less. Nevertheless, since the plug-seating spring must be strong enough to overcome the maximum design pressure unseating force, the spring-seating force is much too great for all pressures much below maximum design pressure.

This invention also relates to lubricating means for high pressure tapered rotary plug valves, commonly known in the art as "high pressure stops." In a stop of this nature, which in actual practice frequently is installed in a relatively inaccessible location below ground, provision must be made for adequate and reliable lubrication to permit turning of the plug even after long periods of disuse. Prior art stops of this nature frequently fail because of dissipation of the lubricant into the fluid being controlled by the valve.

Accordingly, it is an object of this invention to provide an improved tapered rotary plug valve with means for seating the plug with a substantially constant force irrespective of line pressure.

It is another object of this invention to provide a tapered rotary plug valve with means for seating the plug with an optimum force that is substantially unaffected by line pressure.

It is another object of this invention to provide an improved tapered rotary plug valve of simple design for accomplishing the foregoing objects.

It is a further object of this invention to provide an improved lubricated high pressure stop.

Other objects and advantages of the invention will become evident from the following description and accompanying drawings, in which.

Figure 3:
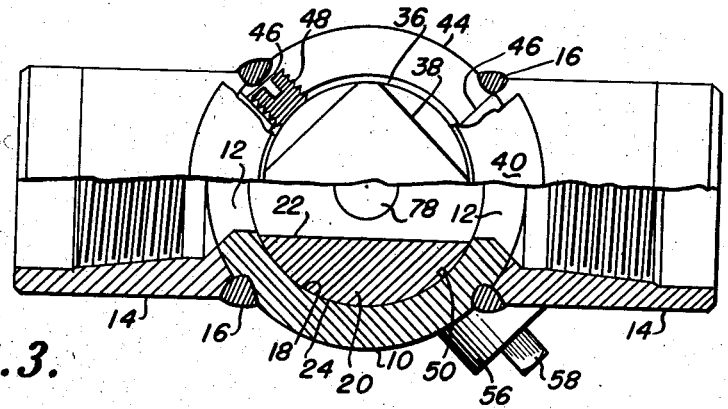
Figure 3 is a sectional view taken on line 3—3 of Figure 2 with parts broken away to show details.
Figure 1:
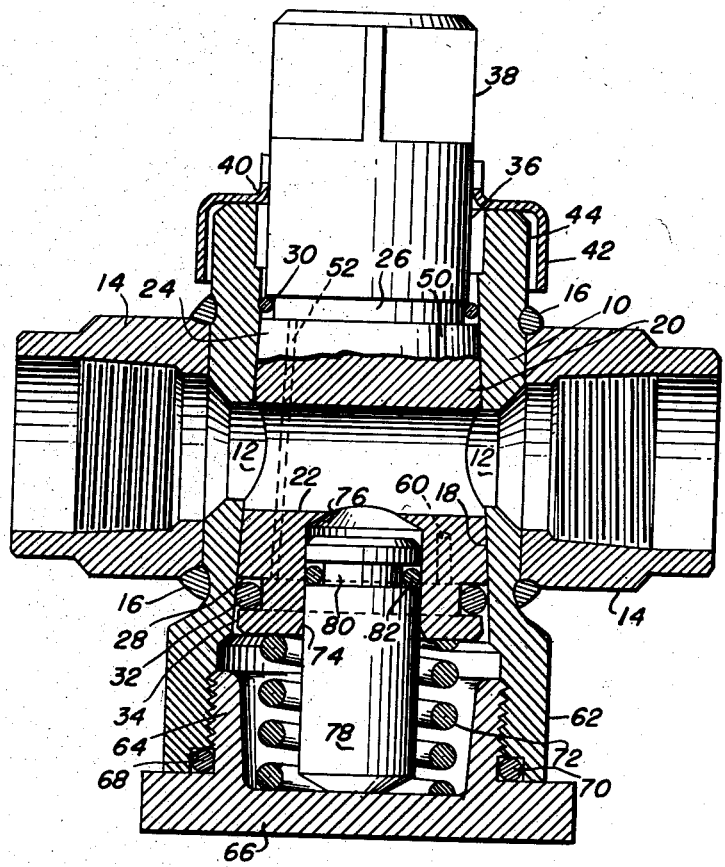
Figure 1 is a vertical sectional view of a tapered rotary plug valve embodying this invention.
Figure 2:
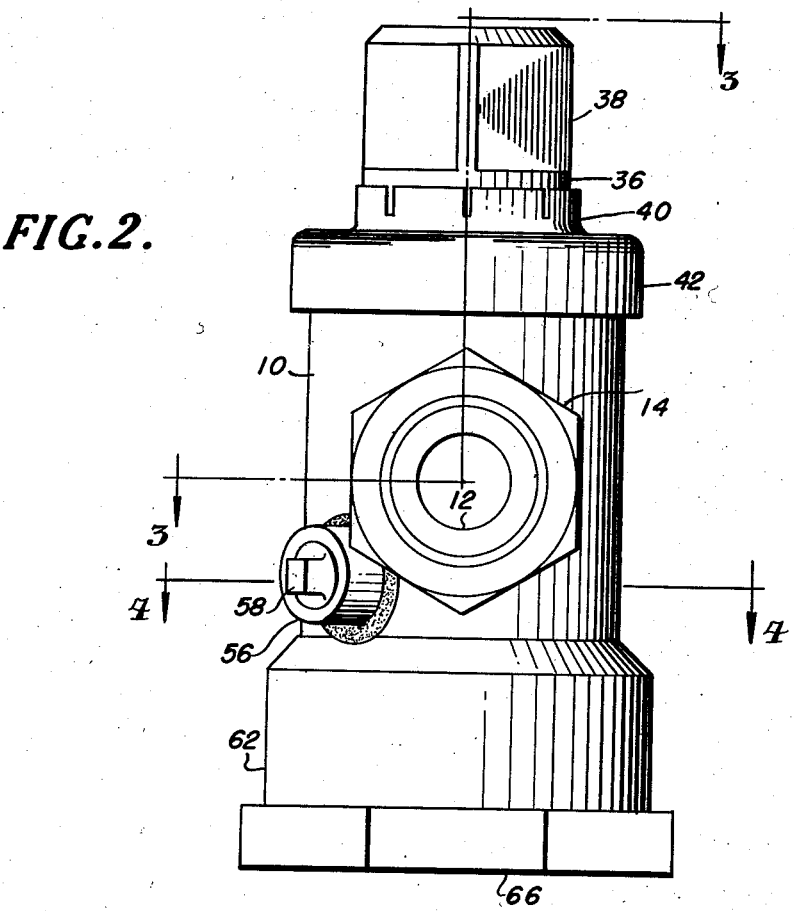
Figure 2 is an end elevational view of the valve shown in Figure 1.

Referring now to the drawings, there is shown a tapered rotary plug valve embodying this invention. The valve shown is what is known in the art as an "inverted high pressure stop" and in the embodiment illustrated may have a design operating pressure of the order of fifteen hundred pounds per square inch. The valve has a shell-like casing or body 10 that for added strength preferably is forged and machined. The body 10 is provided with diametrically-opposed ports 12 about which interiorly-threaded nipples 14 are welded, as at 16, for connection of the valve into a line. The interior of the body 10 has a tapered plug seat 18, and mounted for rotation in the seat is a valve plug 20 having a diametric port 22 therein alignable with the body ports 12 for passage of fluid through the valve.

At both ends of its tapered sealing surface 24, the plug 20 is provided with circumferential packing grooves 26 and 28, both rectangular in cross section. Disposed in the grooves 26 and 28 are resilient pressure-deformable packing rings 30 and 32, respectively, commonly known in the art as "O-rings." Each packing ring, when relaxed, is substantially circular in radial section, narrower than its corersponding groove, and of sufficient size, in radial section, to contact both the bottom of its corresponding groove and the opposed surface of the plug seat 18 in the body 10. At its large end the tapered surface 24 of the plug 20 is relieved outwardly beyond the groove 28, as at 34, so that the opposed surfaces of the plug and the seat are spaced slightly apart outwardly beyond the groove 28. At its small end, the plug 10 is reduced in diameter immediately outwardly beyond the groove 26 and projects outwardly beyond the seat 18 in the body as an integral cylindrical extension 36. Hence, the opposed surfaces of the plug 10 and the seat 18 are spaced slightly apart outwardly beyond the groove 26.

The plug extension 36 has a squared or otherwise non-circular outer end 38 for engagement by an appropriate tool (not shown) to turn the plug 20 for opening and closing the valve. Preferably, a protective collar 40 is frictionally engaged over the plug extension 36 and has a depending peripheral skirt 42 which overhangs and covers an annular interiorly-enlarged portion 44 of the valve body 10 concentric with and extending outwardly beyond the seat 18 at the small end thereof. The annular portion 44 is cut away on about a 90° arc to provide circumferentially-spaced opposed shoulders or abutments 46 engageable by a radial check screw 48 threaded into the plug extension 36 for correspondingly limiting the turning movements of the plug 20.

A pair of diametrically-opposite lubricant channels 50 and 52 extend longitudinally in the sealing surface 24 of the plug 20 between the two grooves 26 and 28. These channels 50 and 52 connect the grooves 26 and 28, inwardly of the O-rings 30 and 32 therein, to form with the grooves a closed lubricant system. The channels 50 and 52 are so located circumferentially of the plug 20 that they are never exposed to, i. e., pass across, either of the body ports 12 during the limited turning movements of the plug between open and closed positions of the valve. Hence, lubricant can never extrude from the channels 50 and 52 into either of the body ports 12 with consequent dissipation of the lubricant. When full of lubricant under pressure, however, the channels 50 and 52 wipe most of the surface area of the valve seat 18 between the two packing grooves 26 and 28 during turning movements of the plug 20 between open and closed positions of the valve. Such wiping of the seat surface spreads a film of lubricant thereover that penetrates between the opposed surfaces of the plug and seat even beyond the areas of the seat surface actually wiped by the channels 50 and 52. Hence, substantially all of the metal-to-metal sealing surfaces of the valve are effectively lubricated.

Figure 4:
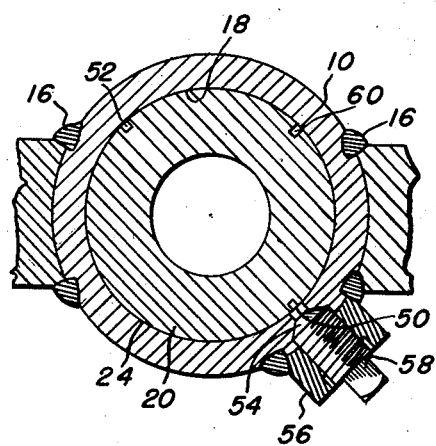
Figure 4 is a sectional view taken on line 4—4 of Figure 2.

In order to charge the lubricant system and provide the advantages thereof disclosed more in detail in the patent to Frank H. Mueller, No. 2,653,791, the valve body 10 is provided with a charging port 54 (Figure 4) with which the lubricant channel 50 is aligned in the open position of the valve. Welded to the valve body 10 about the charging port is an interiorly-threaded boss 56 for the reception of an exteriorly-threaded, lubricant-forcing closure plug 58. With the plug 58 removed, lubricant may be introduced into the boss 56 and the port 54. Replacement of the plug 58 and screwing it into the boss 56 then exerts pressure on the lubricant to force it through the port 54 into the lubricant system.

It will be seen that when the valve plug 20 is turned to close the valve, neither of the lubricant channels 50 or 52 is aligned with the charging port 54. In order to permit charging of the valve with lubricant in closed position, however, the valve plug is provided with a short lubricant channel 60 extending longitudinally from the groove 28 and circumferentially spaced substantially midway between the two lubricant channels 50 and 52. The lubricant channel 60 terminates short of the annular surface zone or band of the valve plug 20 which is exposed to and passes across the body ports 12 during turning movements of the plug in its seat 18, so that the short lubricant channel 60 is never exposed to either of the body ports. The short lubricant channel 60, however, is aligned with the charging port 54 when the valve is in closed position, so that lubricant can be forced under pressure into the short lubricant channel 60 and thence into the aforedescribed closed lubricant system.

As stated heretofore, the stop illustrated is designed for use with extremely high pressures which usually develops corresponding pressures on lubricant in the system. Hence, difficulty might be had in introducing lubricant into the boss 56 and charging port 54 when the valve is under pressure. This difficulty can be avoided, however, merely by turning the valve plug 20 slightly so that the lubricant channel 50 or 60 is moved out of alignment with the charging port 54. Thereupon the boss 56 and port 54 may easily be filled with lubricant, the closure plug 58 replaced, and the valve plug 20 turned to realign the channel 50 or 60 with the port 54, whereupon the closure plug 58 may be screwed in to exert whatever pressure on the lubricant is necessary to force it throughout the entire system.

At the large end of the seat 18 the valve body 10 is provided with an interiorly and exteriorly-enlarged extension 62 that projects beyond the plug seat 18. This extension 62 is interiorly threaded for the reception of an exteriorly-threaded boss 64 on a cap 66 that fits tightly down against the rim of the body extension 62. Preferably the rim of the body extension 62 is provided with an annular packing recess 68 that is substantially rectangular in radial section. Disposed within the recess 68 is an O-ring 70 for sealing engagement with the outer wall of the packing recess 68 and the undersurface of the cap 66. Interposed between the cap 66 and the opposed large end of the valve plug 20 is a coil compression spring 72 that is designed to exert an optimum seating force on the plug 20 so as to maintain the most effective metal-to-metal engagement between the sealing surfaces of the plug and its seat 18.

It will be seen that if the plug 20 is slightly unseated, line pressure can act on the tapered sealing surface 24 thereof between the O-rings 30 and 32 to create an unseating force on the plug 20 substantially equal to the effective pressure multiplied by an area equal to the difference between the cross-sectional area of the plug 20 approximately at the inner side wall of the groove 28 and the cross-sectional area of the plug approximately at the inner side wall of the groove 26. Since, as heretofore stated, the spring 72 is designed to provide only an optimum plug-seating force, if the aforedescribed unseating force exerted on the plug 20 by line pressure is not overcome, a slight unseating of the vlave plug or any circumstance which results in line pressure becoming effective on the tapered exterior surface 24 of the plug will result in an appreciable unseating displacement of the plug. Such a condition obviously would be highly undesirable because of the attendant leakage.

In order to counteract the above-described line pressure plug-unseating force, the plug 20 is provided with a coaxial cylindrical bore 74 extending inwardly from the large end thereof to the plug port 22. At its inner end the bore 74 preferably has a restriction that provides an outwardly-facing shoulder 76. Slidable within the cylinder or bore 74 is a piston 78 that projects outwardly of the bore and has its outer end engaged against the cap 66. The inner end of the piston 78, when the plug 20 is seated, is spaced from the shoulder 76 so that limited unseating movement of the plug is possible. Within the bore 74 the piston 78 is provided with a circumferential groove 80, substantially rectangular in radial section and having an O-ring 82 therein to provide a tight seal against passage of fluid from the plug port 22 between the opposed surfaces of the piston 78 and the bore 74.

From this construction it will be seen that line pressure is effective in the plug port 22 to exert a seating force on the plug 20 substantially equal to line pressure multiplied by the cross-sectional area of the bore 74. Hence, to exactly counteract the aforedescribed unseating force on the plug 20 caused by line pressure becoming effective on the tapered sealing surface 24 thereof, the cross-sectional area of the bore 76 should be equal to the difference in cross-sectional areas of the plug (or the seat) at the O-ring 32 and the O-ring 30, neglecting the groves 28 and 26. Since the axial forces on the plug 20 developed by line pressure are, thus, exactly counterbalanced, the plug at all times is held in optimum engagement with its seat by the spring 72, and such optimum engagement is unaffected by variations in line pressure anywhere from zero to maximum design pressure of the stop. In some instances, however, it might be desirable to utilize line pressure to assist the spring 72 in seating the plug 20. For this purpose, the cross-sectional area of the bore 74 would be slightly larger than the aforedescribed difference in cross-sectional areas of the plug 20 so that the pressure seating force would be slightly greater than the pressure unseating force effective on the plug.

It thus will be seen that the objects of this invention have been fully and effectively accomplished. It will be realized, however, that changes may be made in the specific embodiment shown and described herein for the purpose of illustrating the principles of this invention without departure from such principles. Accordingly, this invention includes all modifications encompassed within the spirit and scope of the following claims.

We claim:

1. In a rotary plug valve having a body provided with a flow passage intersected by a tapered plug seat and a tapered transversely ported plug rotatable in the seat with the end surfaces of the plug isolated from line pressure, the combination comprising: means defining a cylinder within the large end of the plug extending parallel to the axis thereof and communicating at one end with the plug port, the cross-sectional area of said cylinder being at least as large as the difference between the cross-sectional areas of the plug at the largest and smallest diameters thereof in sealing engagement with the seat; piston means within said cylinder restrained against movement relative to the body in the direction of unseating movement of the plug; and resilient means urging the plug into engagement with the seat.

2. The structure defined in claim 1 wherein the cross-sectional area of the cylinder is substantially equal to the said difference.

3. In a rotary plug valve having a body provided with a flow passage intersected by a tapered plug seat and a tapered transversely ported plug rotatable in the seat with the end surfaces of the plug isolated from line pressure, the combination comprising: means defining a cylinder extending coaxially into the plug from the large end thereof, the inner end of said cylinder being in communication with the plug port and the cross-sectional area of said cylinder being substantially equal to the difference between the cross-sectional areas of the plug at the largest and smallest diameters thereof in sealing engagement with the seat; piston means within said cylinder; closure means detachably connected to the body for closing the large end of the seat and providing an abutment for the outer end of said piston means; and spring means interposed between said closure means and the opposed end surface of the plug for urging the latter into engagement with the seat.

4. A high pressure plug stop comprising: a body provided with a flow passage intersected by a tapered plug seat; a tapered plug rotatable in said seat and having a port alignable with said passage, the end surfaces of said plug being isolated from line pressure; means defining a circumferential packing groove in one of the opposed surfaces of said plug and seat adjacent each end of the latter; a resilient pressure-deformable packing ring in each of said grooves, each said ring when relaxed being of sufficient size in radial section to contact both the bottom of its groove and the other of said surfaces; means defining a coaxial cylinder within the large end of said plug communicating with the plug port, the cross-sectional area of said cylinder being at least as large as the difference in cross-sectional areas of said plug at said rings; piston means within said cylinder guiding solely by the walls thereof and restrained against movement relative to the body in the direction of unseating movement of the plug; and resilient means urging the plug into engagement with the seat.

5. The structure defined in claim 4 wherein the cross-sectional area of the cylinder is substantially equal to the said difference.

6. The structure defined in claim 4 including closure means detachably connected to the body, closing the large end of the seat, and engaging one end of the piston means for restraining the latter against the said movement; and wherein the resilient means is a spring interposed between said closure means and the corresponding end of the plug.

7. A high pressure plug stop comprising: a body provided with a flow passage intersected by a tapered plug seat; a tapered plug rotatable in said seat and having a port alignable with said passage; means defining a circumferential packing groove in one of the opposed surfaces of said plug and seat adjacent each end of the latter; a resilient pressure-deformable packing ring in each of said grooves, each said ring when relaxed being non-complementary to the outer side wall of and axially narrower than its corresponding groove and of sufficient size in radial section to contact both the bottom of its groove and the other of said surfaces; interengaging means on said body and said plug for limiting rotation of the latter to substantially 90° for movements between open and closed positions; a pair of diametrically-opposite lubricant channels in the surface of said plug extending longitudinally between said grooves and connecting the latter inwardly of said rings therein to form a closed lubricant system, the circumferential disposition of said channels serving to prevent exposure thereof to said flow passage during said limited rotational movements of said plug; a charging port in said body for supplying said system with lubricant under pressure in both the open and closed positions of the stop, one of said channels being aligned with said charging port in one of said stop positions; and a third lubricant channel in said plug surface extending longitudinally inwardly from one of said grooves and terminating short of an annular zone of said plug surface rotatable past said flow passage, said third channel being aligned with said charging port in the other of said stop positions.

References Cited in the file of this patent

UNITED STATES PATENTS

| | | |
|---|---|---|
| 1,848,369 | Mohr | Mar. 8, 1932 |
| 1,937,122 | Leach | Nov. 28, 1933 |
| 1,994,618 | Nordstrom | Mar. 19, 1935 |
| 2,041,669 | Whittle | May 19, 1936 |
| 2,065,726 | Nordstrom | Dec. 29, 1936 |
| 2,103,536 | Inge | Dec. 28, 1937 |
| 2,145,628 | Milliken | Jan. 13, 1939 |
| 2,573,238 | Wunn | Oct. 30, 1951 |
| 2,653,791 | Mueller | Sept. 29, 1953 |
| 2,663,290 | Walder | Dec. 22, 1953 |
| 2,685,299 | Stolberg | Aug. 3, 1954 |